US010893374B2

(12) United States Patent
Yang et al.

(10) Patent No.: US 10,893,374 B2
(45) Date of Patent: Jan. 12, 2021

(54) ELECTRONIC DEVICE AND AUDIO OUTPUT METHOD FOR ELECTRONIC DEVICE

(71) Applicant: Samsung Electronics Co., Ltd., Gyeonggi-do (KR)

(72) Inventors: Jae Mo Yang, Gyeonggi-do (KR); Min Ho Bae, Seoul (KR); Gang Youl Kim, Gyeonggi-do (KR); Beak Kwon Son, Yongin-si (KR); Chul Min Choi, Seoul (KR); Ga Hee Kim, Gyeonggi-do (KR); Ho Chul Hwang, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 39 days.

(21) Appl. No.: 16/316,071

(22) PCT Filed: Jun. 16, 2017

(86) PCT No.: PCT/KR2017/006354
§ 371 (c)(1),
(2) Date: Jan. 8, 2019

(87) PCT Pub. No.: WO2018/012746
PCT Pub. Date: Jan. 18, 2018

(65) Prior Publication Data
US 2020/0186955 A1 Jun. 11, 2020

(30) Foreign Application Priority Data

Jul. 13, 2016 (KR) ........................ 10-2016-0088534

(51) Int. Cl.
*H04R 5/02* (2006.01)
*H04S 7/00* (2006.01)
(Continued)

(52) U.S. Cl.
CPC ............. *H04S 7/304* (2013.01); *H04R 5/033* (2013.01); *H04R 5/04* (2013.01); *H04S 1/007* (2013.01); *H04S 2420/01* (2013.01)

(58) Field of Classification Search
CPC . H04S 7/00; H04S 7/306; H04S 7/305; H04S 7/302; H04S 7/303; H04S 7/304;
(Continued)

(56) References Cited

U.S. PATENT DOCUMENTS 5,742,689 A * 4/1998 Tucker .................... H04S 3/004
381/17
6,181,800 B1 * 1/2001 Lambrecht .............. H04S 1/002
381/17

(Continued)

FOREIGN PATENT DOCUMENTS

JP 2009-512364 A 3/2009
KR 10-2005-0063613 A 6/2005
(Continued)

OTHER PUBLICATIONS

M.R. Schroeder & B.F. Logan; "Colorless Artificial Reverberation"; pp. 209-214.
(Continued)

*Primary Examiner* — Leshui Zhang
(74) *Attorney, Agent, or Firm* — Cha & Reiter, LLC

(57) ABSTRACT

An electronic device according to various embodiments of the present invention may comprise: a gyro sensor for sensing rotation of an electronic device; a memory for storing a plurality of head related transfer functions corresponding to a plurality of directions; and a processor configured to generate a stereo signal by applying, to an audio signal, a first head related transfer function corresponding to a first direction, generate a stereo signal by applying, to the audio signal, a second head related transfer function corre-
(Continued)

sponding to a third direction symmetric to a second direction with reference to the first direction when the electronic device rotates from the first direction to the second direction, and generate a stereo signal by applying the first head related transfer function to the audio signal when a pre-designated time elapses after the electronic device rotates from the first direction to the second direction.

13 Claims, 13 Drawing Sheets

(51) Int. Cl.
*H04R 5/033* (2006.01)
*H04R 5/04* (2006.01)
*H04S 1/00* (2006.01)

(58) Field of Classification Search
CPC ... H04S 5/00; H04S 5/005; H04S 5/02; H04S 1/00; H04S 1/005; H04S 1/007; H04S 2420/00; H04S 2420/01; H04S 2420/11; H04S 2420/13; H04S 2420/05; H04S 2420/07; H04R 5/033; H04R 5/0335; H04R 5/04
USPC ....... 381/1, 17, 18, 303, 304, 305, 306, 309, 381/310, 311, 61, 26, 74, 111, 116, 117; 700/94
See application file for complete search history.

(56) References Cited

U.S. PATENT DOCUMENTS

| | | | |
|---|---|---|---|
| 6,532,291 B1* | 3/2003 | McGrath | H04S 7/304 381/74 |
| 8,155,358 B2 | 4/2012 | Park et al. | |
| 8,620,012 B2 | 12/2013 | Kim | |
| 9,002,020 B1* | 4/2015 | Kim | H04R 17/10 381/56 |
| 9,037,468 B2 | 5/2015 | Osman | |
| 9,226,089 B2 | 12/2015 | Mundt et al. | |
| 9,226,090 B1 | 12/2015 | Norris et al. | |
| 9,736,613 B2 | 8/2017 | Osman | |
| 2005/0147261 A1* | 7/2005 | Yeh | H04M 3/567 381/92 |
| 2006/0045294 A1* | 3/2006 | Smyth | H04S 7/304 381/309 |
| 2008/0013762 A1* | 1/2008 | Roeck | H04R 25/407 381/309 |
| 2009/0041254 A1* | 2/2009 | Jin | H04S 7/304 381/1 |
| 2009/0136047 A1 | 5/2009 | Kim | |
| 2009/0169037 A1 | 7/2009 | Park et al. | |
| 2011/0103590 A1* | 5/2011 | Christoph | H04S 7/302 381/17 |
| 2011/0211702 A1* | 9/2011 | Mundt | H04S 7/30 381/17 |
| 2012/0092566 A1* | 4/2012 | Lee | H04S 3/008 348/738 |
| 2012/0213375 A1* | 8/2012 | Mahabub | H04S 5/00 381/17 |
| 2012/0328108 A1* | 12/2012 | Enamito | H04S 7/302 381/17 |
| 2013/0041648 A1 | 2/2013 | Osman | |
| 2015/0156599 A1* | 6/2015 | Romigh | H04S 5/005 381/17 |
| 2015/0373477 A1* | 12/2015 | Norris | H04R 5/027 381/303 |
| 2016/0227338 A1* | 8/2016 | Oh | H04S 7/303 |
| 2017/0353812 A1* | 12/2017 | Schaefer | H04S 7/303 |
| 2018/0027349 A1 | 1/2018 | Osman | |

FOREIGN PATENT DOCUMENTS

| | | |
|---|---|---|
| KR | 10-2009-0054583 A | 6/2009 |
| KR | 10-2012-0040290 A | 4/2012 |
| KR | 10-2013-0004372 A | 1/2013 |

OTHER PUBLICATIONS

Jitendra Ajmera, Iain McCowan, Nerve Bourlard; "Speech/Music Discrimination Using Entropy and Dynamism Features in a HMM Classification Framework"; Aug. 2001; 15 pages.

Eric Scheirer & Malcolm Slaney; Construction and Evaluation of a Robust Multifeature Speech/Music Discriminator; pp. 1331-1334.

* cited by examiner

ELECTRONIC DEVICE AND AUDIO OUTPUT METHOD FOR ELECTRONIC DEVICE

CLAIM OF PRIORITY

This application is a National Phase Entry of PCT International Application No. PCT/KR2017/006354, which was filed on Jun. 16, 2017, and claims a priority to Korean Patent Application No. 10-2016-0088534, which was filed on Jul. 13, 2016, the contents of which are incorporated herein by reference.

TECHNICAL FIELD

The present disclosure relates to a method of generating and outputting a stereo audio signal by using an electronic device.

BACKGROUND ART

With the development of electronic technologies, various types of electronic products are being developed and distributed. In particular, portable electronic devices having a variety of functions, such as a smart phone, a tablet personal computer (PC), and the like have been increasingly distributed.

A user may make a call or may listen to music while wearing an audio output device such as an earphone, a headphone, or the like connected to the portable electronic device in his/her ear or on his/her head. Either the earphone or the headphone that outputs sound with high quality or stereo sound effect is being developed in response to the user's request.

DISCLOSURE

Technical Problem

An audio output device such as an earphone or a headphone described above has a limitation in providing a stereo sound effect as the audio output device is directly contact with the user's ear. Moreover, when the stereo sound effect is applied to all audio signals regardless of the type of audio signal, the clarity of voice may be reduced in a situation where the output of a voice signal is required as in a voice communication environment.

Aspects of the present disclosure are to address at least the above-mentioned problems and/or disadvantages and to provide at least the advantages described below. Accordingly, an aspect of the present disclosure is to provide an electronic device and an audio outputting method of an electronic device that differently apply stereo sound effects depending on the type of audio signal and maximize the stereo sound effect when the applying of the stereo sound effect is required.

Technical Solution

In accordance with an aspect of the present disclosure, an electronic device may include a gyro sensor sensing rotation of the electronic device, a memory storing a plurality of head related transfer functions corresponding to a plurality of orientations, and a processor. The processor may be configured to apply a first head related transfer function corresponding to a first orientation to an audio signal to generate a stereo signal, when the electronic device rotates from the first orientation to a second orientation, to apply a second head related transfer function corresponding to a third orientation, which is symmetrical to the second orientation with respect to the first orientation, to the audio signal to generate the stereo signal, and when a specific time elapses after the electronic device rotates from the first orientation to the second orientation, to apply the first head related transfer function to the audio signal to generate the stereo signal.

In accordance with another aspect of the present disclosure, an audio outputting method of an electronic device may include applying a first head related transfer function corresponding to a first orientation to an audio signal to generate a stereo signal, sensing rotation of the electronic device by using a gyro sensor, when the electronic device rotates from the first orientation to a second orientation, applying a second head related transfer function corresponding to a third orientation, which is symmetrical to the second orientation with respect to the first orientation, to the audio signal to generate the stereo signal, and when a specific time elapses after the electronic device rotates from the first orientation to the second orientation, applying the first head related transfer function to the audio signal to generate the stereo signal.

Advantageous Effects

According to various embodiments of the present disclosure, it is possible to provide the stereo sound effect in consideration of the type of audio signal and it is possible to provide the realistic stereo sound effect. It is possible to apply a virtual stereo sound filter to an audio signal, thereby reducing a memory space and data throughput.

MODE FOR INVENTION

Figure 1:
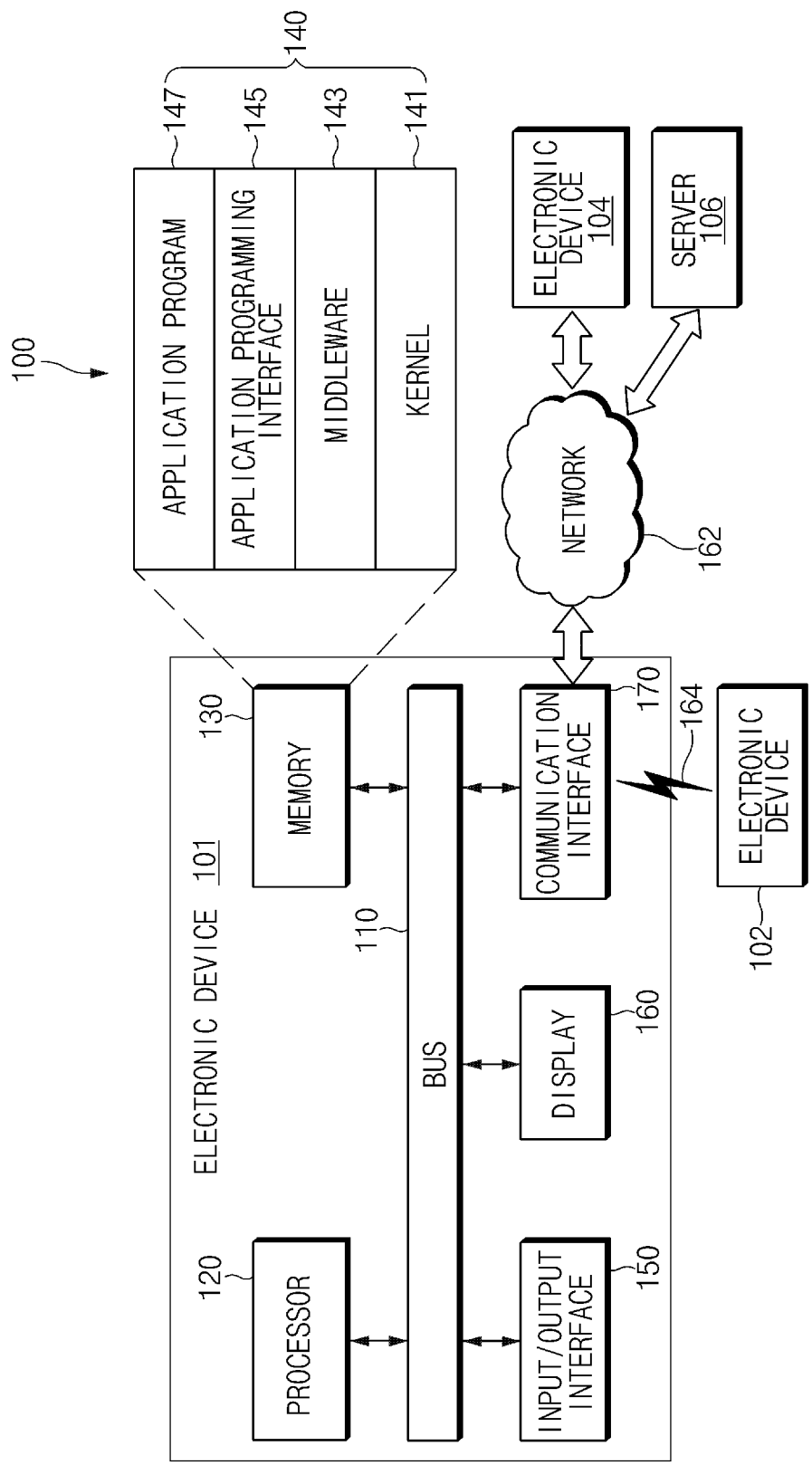
FIG. 1 illustrates an electronic device, according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 illustrates an electronic device in a network environment, according to various embodiments.

Referring to FIG. 1, according to various embodiments, an electronic device 101, 102, or 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic device 101.

The memory 130 may include a volatile and/or nonvolatile memory. For example, the memory 130 may store commands or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources. The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

The wireless communication may include cellular communication using at least one of, for example, a long-term evolution (LTE), an LTE Advance (LTE-A), a code division multiple access (CDMA), a wideband CDMA (WCDMA), a universal mobile telecommunications system (UMTS), a wireless broadband (WiBro), a global system for mobile communications (GSM), or the like. According to an embodiment, the local area network may include at least one of wireless fidelity (Wi-Fi), Bluetooth, Bluetooth low energy (BLE), Zigbee, near field communication (NFC), magnetic secure transmission (MST), radio frequency (RF), body area network (BAN), or global navigation satellite system (GNSS).

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the first external electronic device 102, the second external electronic device 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the first external electronic device 102, the second external electronic device 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
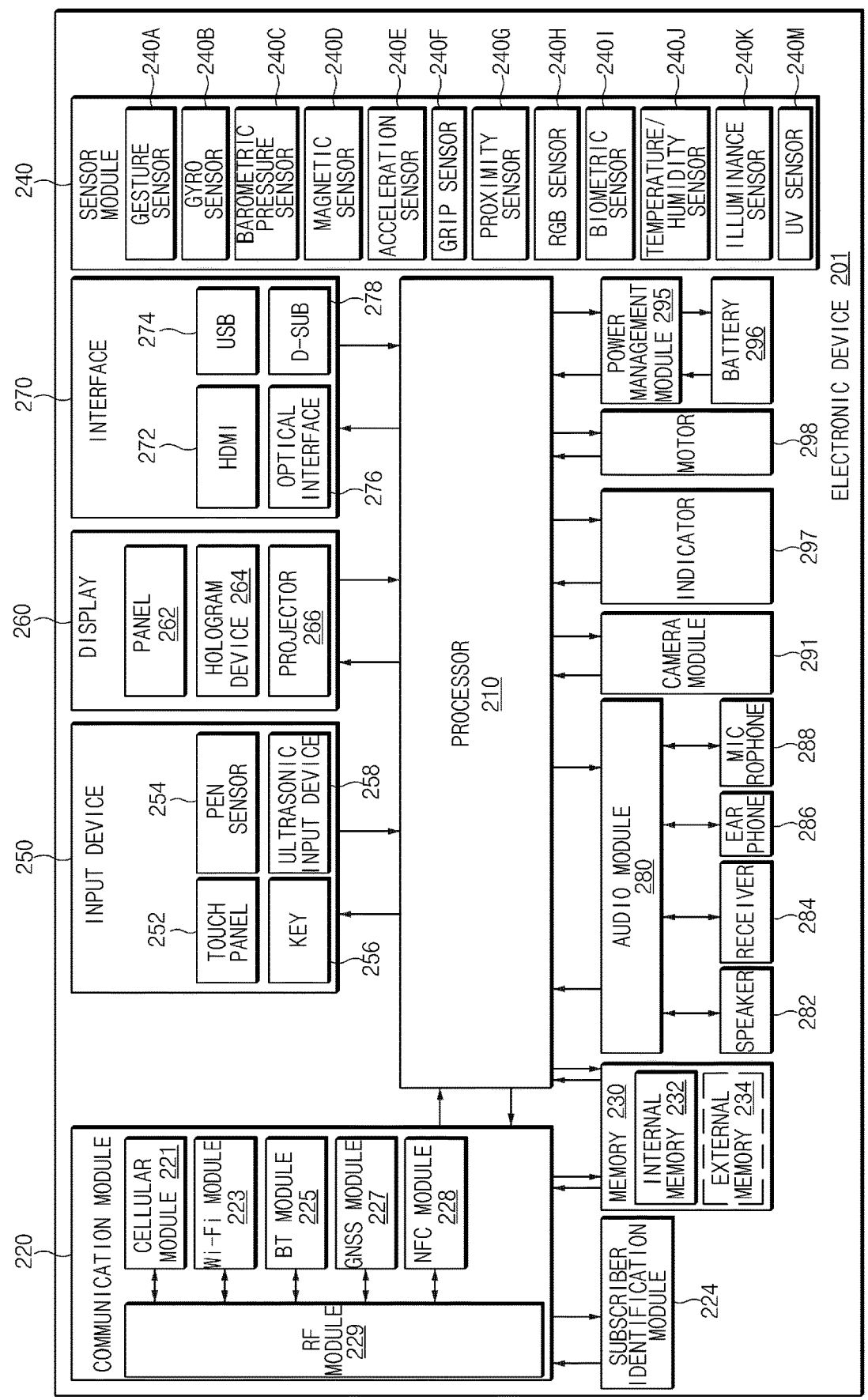
FIG. 2 illustrates a block diagram of the electronic device, according to various embodiments.

FIG. 2 illustrates a block diagram of an electronic device, according to various embodiments.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded command or data. The processor 210 may store a variety of data in the nonvolatile memory.

The communication module 220 may be configured the same as or similar to the communication interface 170 of FIG. 1. The communication module 220 may include the cellular module 221, a Wi-Fi module 223, a Bluetooth (BT) module 225, a GNSS module 227 (e.g., a GPS module, a Glonass module, a Beidou module, or a Galileo module), a near field communication (NFC) module 228, a MST module and a radio frequency (RF) module 229.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the processor 210 provides. According to an embodiment, the cellular module 221 may include a communication processor (CP).

Each of the Wi-Fi module 223, the BT module 225, the GNSS module 227, the NFC module 228, or the MST module may include a processor for processing data exchanged through a corresponding module, for example. According to an embodiment, at least a part (e.g., two or more) of the cellular module 221, the Wi-Fi module 223, the BT module 225, the GNSS module 227, the NFC module 228, or the MST module 226 may be included within one Integrated Circuit (IC) or an IC package.

For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, the NFC module 228, or the MST module 226 may transmit and receive an RF signal through a separate RF module.

The subscriber identification module 224 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal. According to an embodiment, the touch panel 2352 may include a pressure sensor (or force sensor, interchangeably used hereinafter) that measures the intensity of touch pressure by a user. The pressure sensor may be implemented integrally with the touch panel 252, or may be implemented as at least one sensor separately from the touch panel 252.

The display 260 (e.g., the display 160) may include a panel 262, a hologram device 264, or a projector 266. The panel 262 may be configured the same as or similar to the display 160 of FIG. 1. The panel 262 may be implemented to be flexible, transparent or wearable, for example. The panel 262 and the touch panel 252 may be integrated into a single module. The hologram device 264 may display a stereoscopic image in a space using a light interference phenomenon. The projector 266 may project light onto a screen so as to display an image. The screen may be arranged inside or outside the electronic device 201. According to an embodiment, the panel 262 may include a pressure sensor (or a "force sensor") that is capable of measuring the intensity of pressure on the touch of the user. The pressure sensor may be integrated with the touch panel 252 or may be implemented with one or more sensors that are independent of the touch panel 252. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high definition link (MEL) interface, a SD card/multi-media card (MMC) interface, or an infrared data association (IrDA) standard interface.

The audio module 280 may convert a sound and an electric signal in dual directions. At least a component of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 3:
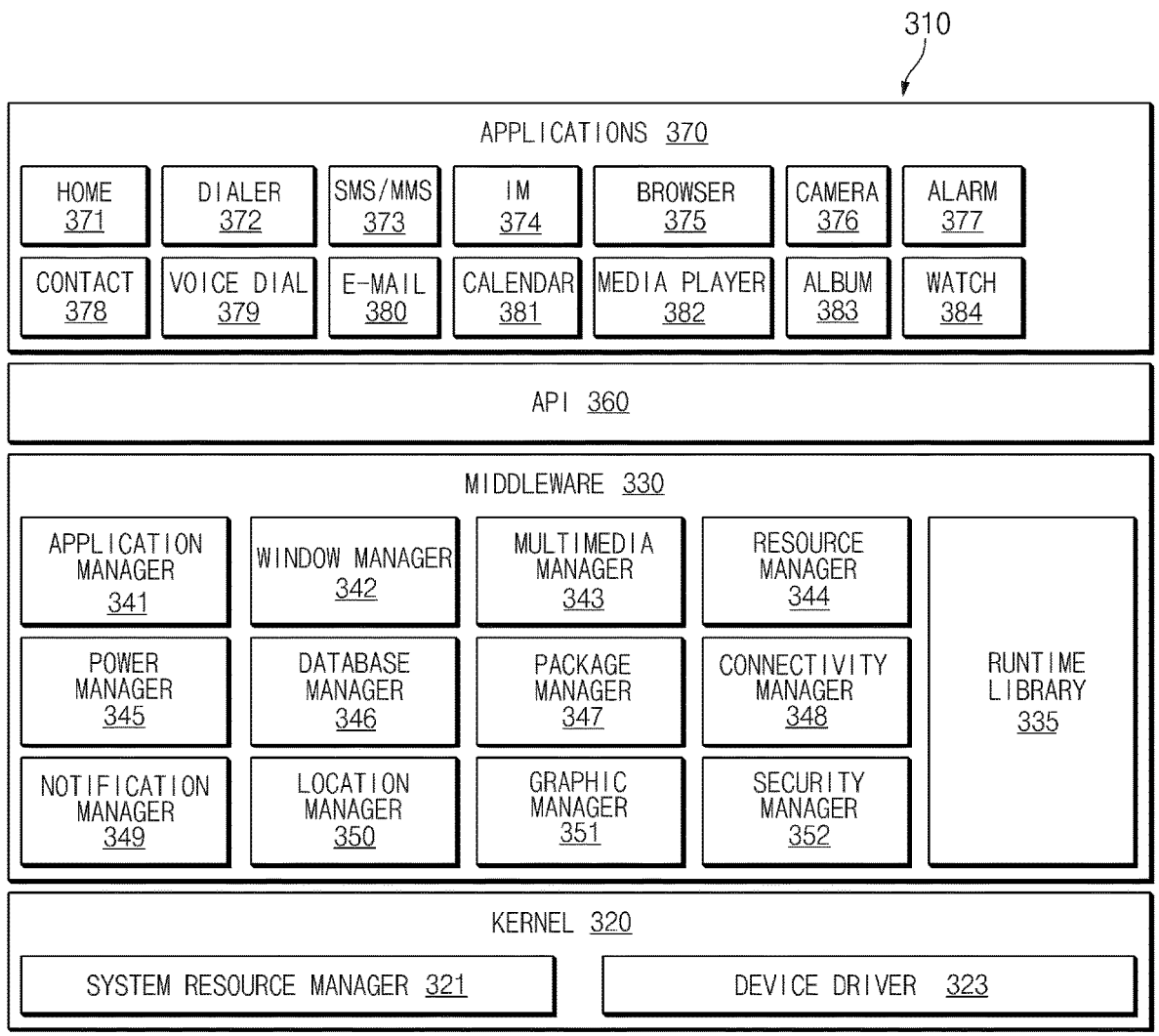
FIG. 3 illustrates a block diagram of a program module, according to various embodiments.

FIG. 3 illustrates a block diagram of a program module, according to various embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Linux™, Symbian™, Tizen™, or Bada™.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, or the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described components. The middleware 330 may provide a module specialized to each OS kind to provide differentiated functions. Additionally, the middleware 330 may dynamically remove a part of the preexisting components or may add new components thereto.

The API 360 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, and a watch 384 or for offering health care (e.g., measuring an exercise quantity, blood sugar, or the like) or environment information (e.g., information of barometric pressure, humidity, temperature, or the like).

According to an embodiment, the application 370 may include an application (hereinafter referred to as "information exchanging application" for descriptive convenience) to support information exchange between an electronic device (e.g., the electronic device 101) and an external electronic device (e.g., the first external electronic device 102 or the second external electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the first external electronic device 102 or the second external electronic device 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device (e.g., the first external electronic device 102 or the second external electronic device 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device) that is assigned in accordance with an attribute of an external electronic device (e.g., the first external electronic device 102 or the second external electronic device 104). According to an embodiment, the application 370 may include an application that is received from an external electronic device (e.g., the server 106, the first external electronic device 102, or the second external electronic device 104). According to an embodiment, the application 370 may include a preloaded application or a third party application that is downloadable from a server. The names of components of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
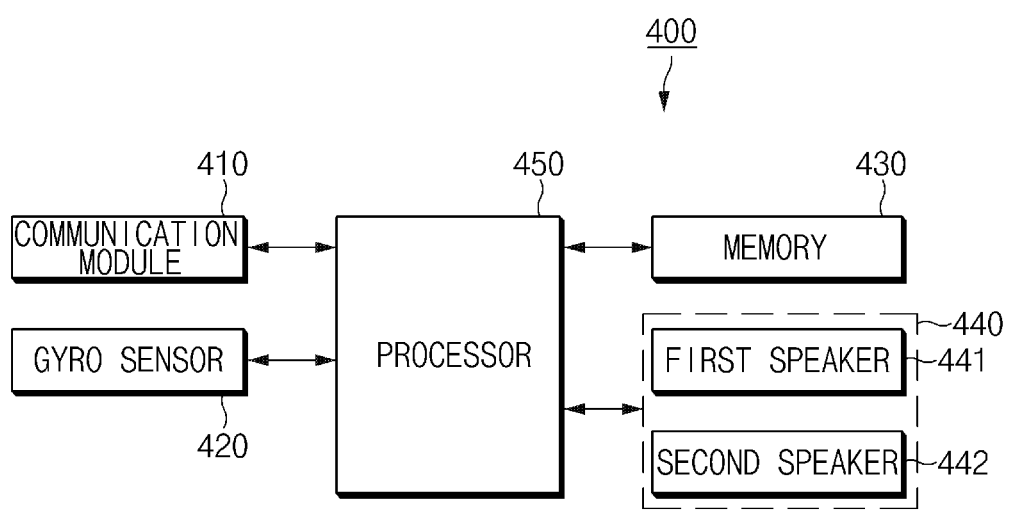
FIG. 4 is a block diagram illustrating a configuration of an electronic device, according to various embodiments of the present disclosure.

FIG. 4 is a block diagram illustrating a configuration of an electronic device, according to various embodiments of the present disclosure.

Referring to FIG. 4, an electronic device 400 (e.g., the electronic device 101) may include a communication module 410, a gyro sensor 420, a memory 430, a speaker 440, and a processor 450. For example, the electronic device 400 according to various embodiments of the present disclosure may be a portable electronic device such as a smart phone, a tablet PC, a wearable device (e.g. smart glass), a virtual reality (VR) device, or an audio player (e.g., MP3 player). For another example, the electronic device 400 may be an audio output device wiredly or wirelessly connected to the above-described portable electronic device such as an earphone, a headphone, or the like so as to receive an audio signal from the portable electronic device and to output the audio signal.

According to an embodiment, the communication module 410 may communicate with an external electronic device. According to an embodiment, the communication module 410 may include a wireless communication module such as a cellular module, a wireless-fidelity (Wi-Fi) module, or a Bluetooth module. According to an embodiment, the communication module 410 may include a wired communication interface such as auxiliary (AUX) or universal serial bus (USB).

According to an embodiment, the communication module 410 may receive the audio signal from the external electronic device. For example, the communication module 410 may receive the audio signal from the external electronic device (e.g., a smart phone) that is connected to the electronic device 400 over short range wireless communication or wiredly. For another example, the communication module 410 may receive the audio signal from the external electronic device (e.g., a content server or a mobile communication server) over an Internet network or a mobile communication network. For example, the audio signal received from the external electronic device may be a mono signal. For example, the audio signal may include all types of audio signals, such as an audio signal included in the content (e.g., music, movies, games, video, or the like), a voice signal included in data of a call (e.g., a voice call or a video call), and the like.

According to an embodiment, the communication module 410 may receive an angular velocity value of the external electronic device from the external electronic device. For example, when the electronic device 400 does not include the gyro sensor 420, the electronic device 400 may receive the angular velocity value corresponding to the rotation of the user's head from the external electronic device.

According to an embodiment, the gyro sensor 420 may sense the rotation of the electronic device 400 (or the rotation of the user's head). According to an embodiment, the gyro sensor 420 may sense the rotational angular velocity of the electronic device 400. For example, the gyro sensor 420 may sense the angular velocity of the electronic device 400 to output the angular velocity value in three-axis (e.g., X axis, Y-axis, and Z-axis) directions.

According to an embodiment, the electronic device 400 may include the plurality of gyro sensors 420. According to an embodiment, the plurality of gyro sensors 420 may be included in a first speaker 441 and a second speaker 442, respectively. For example, each of the plurality of gyro sensors 420 may be included in the housing surrounding the first speaker 441 and the second speaker 442. When the user rotates his/her head while the user wears an earphone or a headphone, the earphone or the headphone may rotate together, and each of the plurality of gyro sensors 420 may output the angular velocity value according to the rotation of each of the first speaker 441 and the second speaker 442.

According to an embodiment, the memory 430 may store a head related transfer function. The head related transfer function may vary depending on the orientation of a sound image. For example, the memory 430 may store a plurality of head related transfer functions corresponding to a plurality of orientations (or angles) in the three-dimensional space.

According to an embodiment, the memory 430 may store an audio signal. For example, the audio signal may be received from the external electronic device via the communication module 410 or may be stored in the memory 430 after being recorded via a microphone (not shown).

According to an embodiment, the head related transfer function may be stored in the memory 430 after being directly measured in the manner of changing the location of the sound image in the three-dimensional space. The head related transfer function may be sensitively influenced by the size and shape of the user's head, the size and shape of the user's ear. According to an embodiment, the head related transfer function may be generated through a virtual modeling method, in consideration of the influence of the at least one of the user's head, shoulders, and auricles. For example, the virtual head related transfer function may be modeled in consideration of the effects of the user's head and shoulders, except for the effects of the user's auricles. The head related transfer function will be described in detail with reference to FIG. 5.

Figure 5:
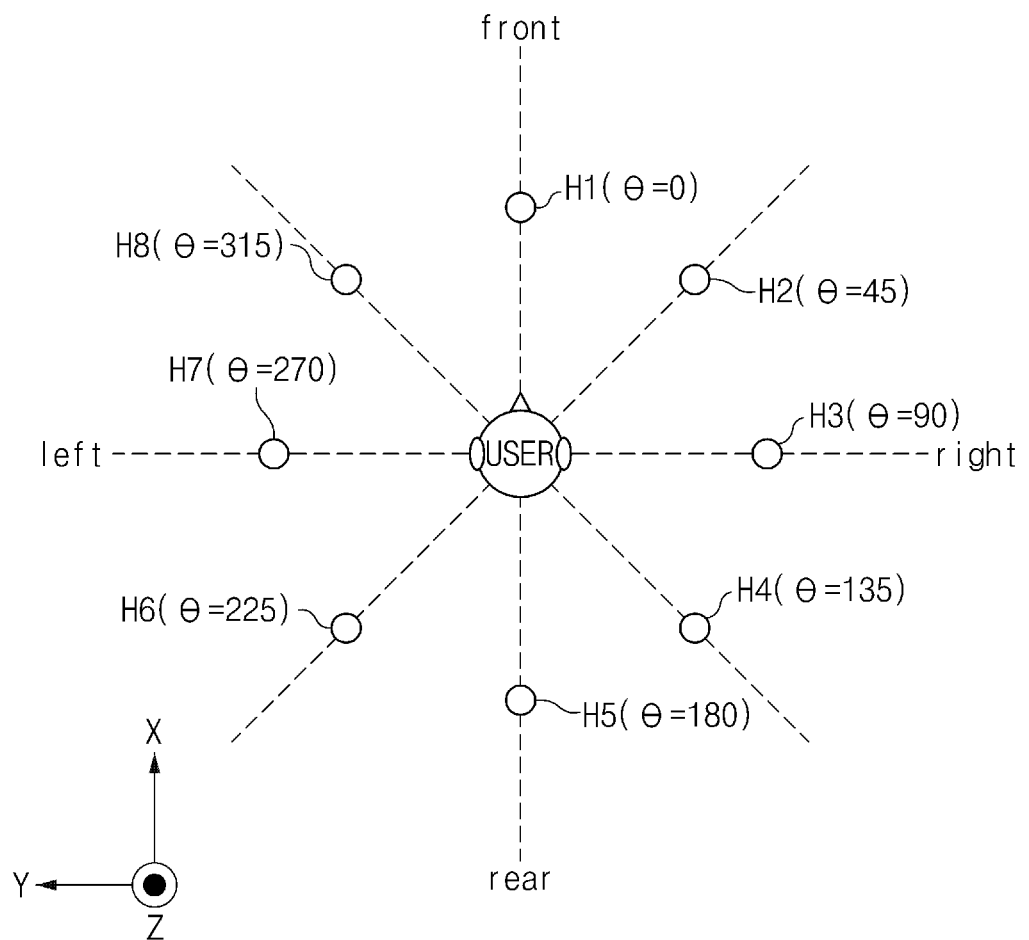
FIG. 5 illustrates an example of a head related transfer function, according to various embodiments of the present disclosure.

FIG. 5 illustrates an example of a head related transfer function, according to various embodiments of the present disclosure.

Referring to FIG. 5, a head related transfer function may be measured (or modeled) about a user's head USER at intervals of a specified angle (e.g., 45 degrees). For example, when being measured with respect to Z-axis (yaw axis) at intervals of 45 degrees, the head related transfer function may include eight head related transfer functions H1 to H8. For example, the first head related transfer function H1 may correspond to a case where the sound image is placed in front of the user; the third head related transfer function H3 may correspond to a case where the sound image is located to the right side of the user.

According to an embodiment, the memory 430 may store a head related transfer function table including a plurality of head related transfer functions. Table 1 illustrates an example of the head related transfer function table stored in the memory.

TABLE 1

| θ (degree) | HRTF (Left) | HRTF (Right) |
|---|---|---|
| 0 | H1_L | H1_R |
| 10 | H2_L | H2_R |
| 20 | H3_L | H3_R |
| ... | ... | ... |
| 330 | H34_L | H34_R |
| 340 | H35_L | H35_R |
| 350 | H36_L | H36_R |

Referring to Table 1, the head related transfer function table may include the plurality of head related transfer functions measured (or modeled) with respect to Z-axis (yaw axis) at intervals of specified angles (e.g., 10 degrees).

According to an embodiment, the head related transfer function table may include a plurality of (e.g., two) head related transfer functions corresponding to one specific orientation. For example, the head related transfer function table may include items such as an angle θ, a left head related transfer function HRTF_L, and a right head related transfer function HRTF_R. The left head related transfer function HRTF_L may be a head related transfer function for generating a first channel signal; and the right head related transfer function HRTF_R may be a head related transfer function for generating a second channel signal. For example, the first head related transfer function corresponding to the front orientation (θ=0 degree) of the user may include a first left head related transfer function H1_L and a first right head related transfer function H1_R.

The head related transfer function table illustrated in Table 1 may include a head related transfer function measured at intervals of 10 degrees. However, according to various embodiments, the head related transfer function may be measured at various intervals of, for example, 1 degree, 2 degrees, 5 degrees, 15 degrees, 45 degrees, and the like.

For convenience of description, an embodiment described with reference to FIG. 5 or Table 1 is exemplified as the head related transfer function that considers only the rotation in the direction of Z-axis (yaw axis). However, according to various embodiments of the present disclosure, the head related transfer function that considers the rotation in the direction of X-axis (roll axis) or Y-axis (pitch axis) may be used or the head related transfer function that considers a plurality of axes (e.g., Z-axis and Y-axis) may be used.

According to an embodiment, the memory 430 may store a room impulse response function. For example, the memory 430 may store at least one room impulse response function corresponding to at least one orientation (or location) in a three-dimensional space.

According to an embodiment, the room impulse response function may be generated by measuring the sound generated from a sound source placed in a specific orientation in an indoor environment during a specific time. The room impulse response function may include a reverberation component in which the sound generated from the sound source is reflected by a wall, a ceiling, or the like.

According to an embodiment, the memory 430 may store a plurality of (e.g., two) room impulse response functions corresponding to one specific orientation. For example, the room impulse response function corresponding to one specific orientation may include a room impulse response function for generating a first channel signal and a room impulse response function for generating a second channel signal.

According to an embodiment, the speaker 440 may output an audio signal. According to an embodiment, the speaker 440 may include a plurality of speakers (e.g., the first speaker 441 and the second speaker 442). According to an embodiment, the first speaker 441 may output the first channel signal (e.g., a left-side signal); and the second speaker 442 may output the second channel signal (e.g., a right-side signal).

According to an embodiment, the speaker 440 may be implemented to be inserted into the user's ears, for example, an earphone or to cover the user's ears, for example, a headphone. According to an embodiment, when the electronic device 400 is a headphone or an earphone, the first speaker 441 may be a left (L) speaker, and the second speaker 442 may be a right (R) speaker. According to an embodiment, the first speaker 441 and the second speaker 442 may output the audio signal to the left ear and the right ear of the user, respectively. For example, the audio signal output through the first speaker 441 may be recognized by the user through only the left ear of the user; and the audio signal output through the second speaker 442 may be recognized by the user through only the right ear of the user. According to an embodiment, each of the first speaker 441 and the second speaker 442 may include a plurality of speakers (e.g., a plurality of balanced armature (BA)) speakers).

According to an embodiment, the processor 450 may be electrically connected with components 410 to 440 included in the electronic device 400 and may perform an arithmetic operation or data processing associated with control and/or communication of the elements included in the electronic device 400. According to an embodiment, the processor 450 may be implemented with a system on chip (SoC) that includes at least one processor (or a central processing unit (CPU)), a graphic processing unit (GPU), a memory, and the like.

According to an embodiment, the processor 450 may receive the audio signal over the communication module 410. According to an embodiment, the processor 450 may apply the head related transfer function to the audio signal received through the communication module 410 or the audio signal stored in the memory 430 to generate the stereo signal.

According to an embodiment, the processor 450 may sense the rotation (or the rotation of the user's head) of the electronic device 400, using an angular velocity value sensed by the gyro sensor 420 or an angular velocity value received from an external electronic device through the communication module 410. For example, the processor 450 may determine the rotation direction and the rotation angle of the electronic device 400 (or the user's head). According to an embodiment, when the plurality of gyro sensors 420 included in the first speaker 441 and the second speaker 442 rotate in the same direction by the same angle, the processor 450 may determine that the electronic device 400 (or the user's head) rotates.

According to an embodiment, the processor 450 may generate the stereo signal, using the head related transfer function corresponding to the rotation (or the rotation of the user's head) of the electronic device 400.

According to an embodiment, the processor 450 may output the stereo signal through the first speaker 441 and the second speaker 442. For example, the processor 450 may output a first channel signal (e.g., a left-side signal) of a stereo signal through the first speaker 441 and may output the second channel signal (e.g., a right-side signal) of the stereo signal through the second speaker 442.

According to an embodiment, the processor 450 may determine whether the user wears the first speaker 441 and the second speaker 442, using the angular velocity value sensed by the plurality of gyro sensors 420. According to an embodiment, when it is determined that the user wears only one of the first speaker 441 and the second speaker 442, the processor 450 may output the audio signal (e.g., a mono signal) as it is, without generating the stereo signal.

According to an embodiment, the processor 450 may apply the room impulse response function to the audio signal to generate an externalization signal. According to an embodiment, the processor 450 may generate the externalization signal, using the room impulse response function corresponding to the rotation (or the rotation of the user's head) of the electronic device 400. According to an embodiment, the processor 450 may determine whether the audio signal is a voice signal. According to an embodiment, the processor 450 may apply different impulse response functions to the audio signal depending on whether the audio signal is the voice signal.

According to an embodiment, the processor 450 may synthesize the stereo signal and the externalization signal and may output the synthesized signal through the first speaker 441 and the second speaker 442.

Figure 6:
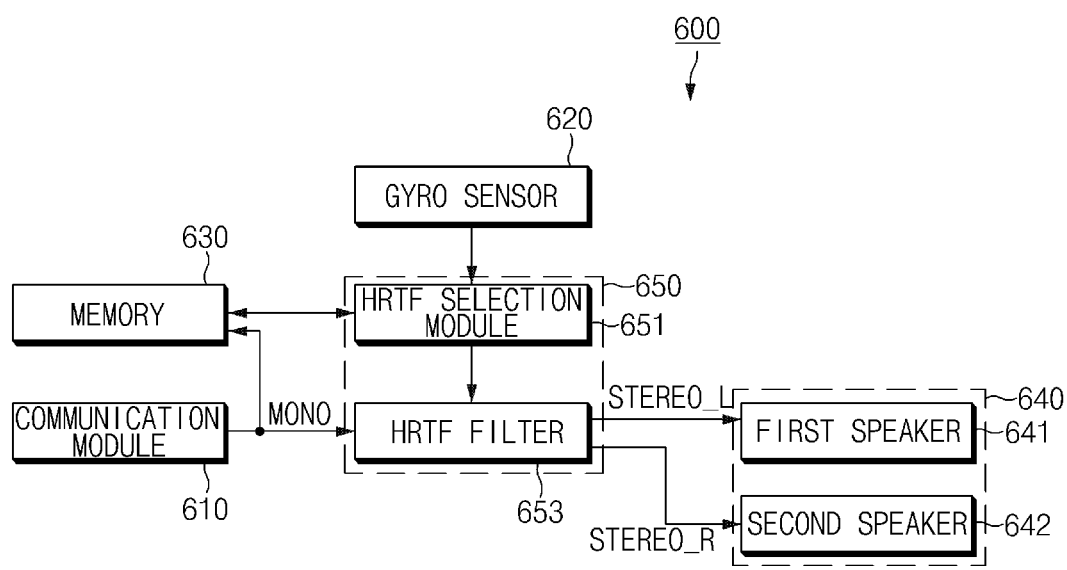
FIG. 6 is a block diagram illustrating a configuration of an electronic device, according to various embodiments of the present disclosure.

FIG. 6 is a block diagram illustrating a configuration of an electronic device, according to various embodiments of the present disclosure.

Referring to FIG. 6, an electronic device 600 (e.g., the electronic device 400) may include a communication module 610, a gyro sensor 620, a memory 630, a speaker 640, and a processor 650.

Since the communication module 610, the gyro sensor 620, the memory 630, and the speaker 640 of a configuration of the electronic device 500 illustrated in FIG. 6 may perform the same or similar function as or to the communication module 410, the gyro sensor 420, the memory 430, and the speaker 440 illustrated in FIG. 4, the detailed descriptions thereof may be omitted, and the operation of the processor 650 will be mainly described.

According to an embodiment, the processor 650 may include a HRTF selection module 651 and a HRTF filter 653.

According to an embodiment, the HRTF selection module 651 may select (or generate) at least one head related transfer function, which is to be applied to an audio signal, from among a plurality of head related transfer functions stored in the memory 630. An operation in which the HRTF selection module 651 selects or generates the head related transfer function will be described in detail with reference to FIGS. 7 and 8.

Figure 7:
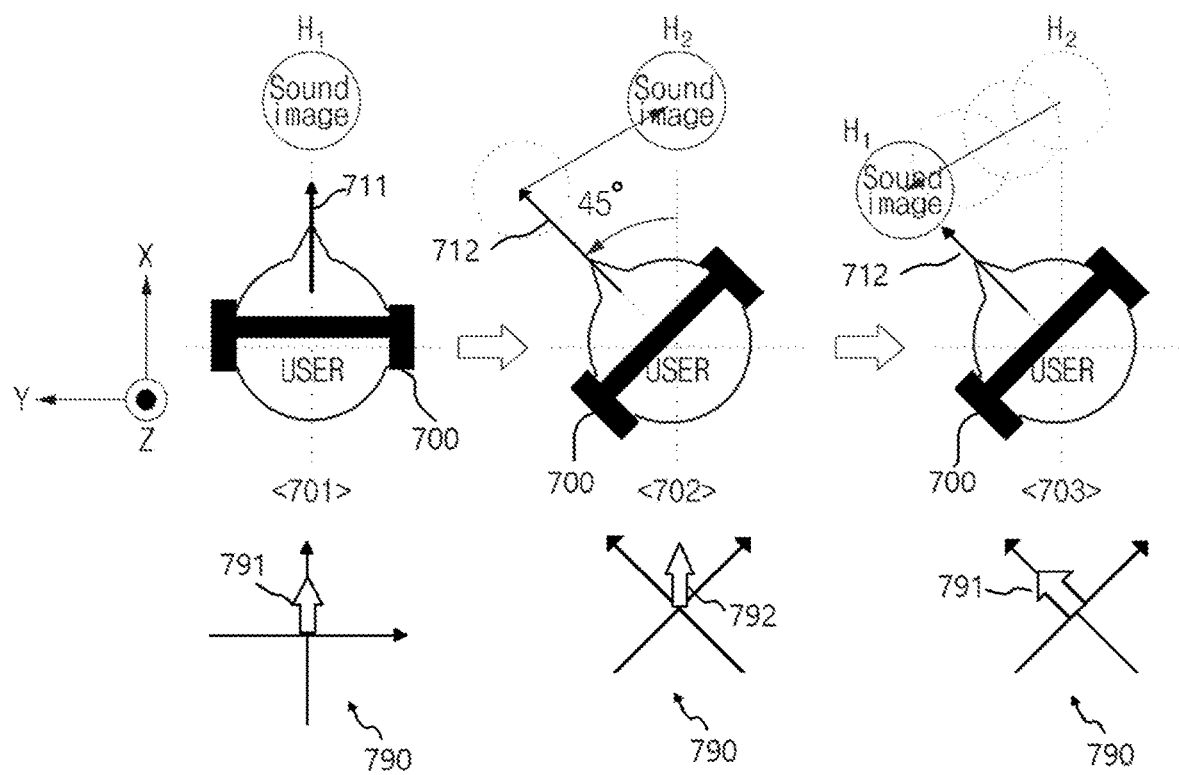
FIG. 7 is a view illustrating a method of selecting a head related transfer function, according to various embodiments of the present disclosure.

FIG. 7 is a view illustrating a method of selecting a head related transfer function, according to various embodiments of the present disclosure.

The embodiment described with reference to FIG. 7 is exemplified as a head related transfer function is measured at intervals of 45 degrees and then is stored in the memory 630, as described with reference to FIG. 5.

According to an embodiment, the HRTF selection module 651 may select a head related transfer function based on the rotation (or the rotation of a user's head) of the electronic device 500. The HRTF selection module 651 may determine whether the user's head rotates, a rotation direction, and an angle, using the angular velocity value received from the gyro sensor 620.

According to an embodiment, the HRTF selection module 651 may select the head related transfer function corresponding to a first orientation (791) relative to an electronic device (700) (e.g., the electronic device (600)) in a state where the user's head does not rotate. For example, referring to image 701, when the user's head does not rotate, the HRTF selection module 651 may select the first head related transfer function H1 corresponding to the first orientation (791) relative to the electronic device (700). For example, the first head related transfer function may be a head related transfer function corresponding to a sound image placed in the first orientation (791) relative to the electronic device (200).

According to an embodiment, when the user's head rotates from the first direction (711) to a second direction (712), the HRTF selection module 651 may select a second head related transfer function corresponding to a second orientation (792) in the electronic device(700)'s coordination system (790). The first orientation (791) and the second orientation (792) may be relative orientations with respect to the front direction of the electronic device (700) other than absolute directions. For example, referring to image 702 of FIG. 7, when a user's head rotates to the left side (or counterclockwise) by 45 degrees to the second direction (712), the HRTF selection module 651 may select the second head related transfer function H2 corresponding to the second orientation (792) to from the sound image (H2) in a direction rotated to the right side (or clockwise) by 45 degrees from a front direction of the electronic device (700). For example, the second head related transfer function may be a head related transfer function corresponding to a sound image placed in the second orientation (792) relative to the electronic device (700).

According to an embodiment, when a specific time elapses after the user's head rotates from the first direction (711) to the second direction (712), the HRTF selection module 651 may select the first head related transfer function corresponding to the first orientation (791) relative to the electronic device. For example, referring to the image 703 of FIG. 7, when the specific time elapses after the user's head rotates from the first direction (711) to the second direction (712), the HRTF selection module 651 may select the first head related transfer function H1 corresponding to the first orientation (791) relative to the electronic device. According to an embodiment, when changing the head related transfer function from the second head related transfer function to the first head related transfer function, the HRTF selection module 651 may gradually change the head related transfer function during the specific time.

According to an embodiment, when changing the head related transfer function from the second head related transfer function to the first head related transfer function, the HRTF selection module 651 may respectively set weights to the first head related transfer function and the second head related transfer function and may synthesize the first head related transfer function and the second head related transfer function depending on the set weights. The HRTF selection module 651 may change the weight set to each of the first head related transfer function and the second head related transfer function, as time goes on and then may allow the head related transfer function to be gradually changed during the specific time. For example, the HRTF selection module 651 may increase the weight set to the first head related transfer function during the specific time and may decrease the weight set to the second head related transfer function during the specific time. After the specific time elapses, the HRTF selection module 651 may select only the first head related transfer function.

According to an embodiment, the HRTF selection module 651 may synthesize head related transfer functions depending on Equation 1 below.

$$h(t) = \delta h(t-\tau) + (1-\delta)h_{crt}(t)$$ [Equation 1]
$$h_{crt}(t) = h(\theta(t))$$
$$\theta(t) = \frac{\theta_{rot}}{\alpha}(t-\alpha)$$

't' may denote the time elapsing after the user's head rotates; h(t) may denote the head related transfer function synthesized at time 't'; $h_{crt}(t)$ may denote the head related transfer function currently selected depending on the rotation of the user's head. 'δ' may denote a smoothing coefficient; as 'δ' is set higher, the weight of the currently selected head related transfer function $h_{crt}(t)$ may decrease; as 'δ' is set lower, the weight of the currently selected head related transfer function $h_{crt}(t)$ may increase. 'τ' may be a delay time; and 'τ' may be generally set to the time of one frame in a frame-by-frame operation. When 'τ' is set to the time of one frame, h(t-τ) may be the head related transfer function of the immediately previously processed frame. $\theta_{rot}$ may denote the rotation angle of the user's head; and 'α' may denote a coefficient for adjusting the speed at which the user's head returns to the angle in a state where the user's head does not rotate after the user's head rotates. θ(t) may denote the orientation (or angle) of the current sound image according to the rotation of the user's head; θ(t) may be changed as time goes on after the user's head rotates. For example, $\theta_{rot}$ may be 0 degree in a state where the user's head does not rotate; as such, $h_{crt}(t)$ may be the head related transfer function corresponding to h(0 degree), that is, the front orientation. When the user's head rotates by −45 degrees, $\theta_{rot}$ may be 45 degrees; $h_{crt}(0)$ immediately after the user's head rotates (t=0) may be the head related transfer function corresponding to 45 degrees. Afterward, when θ(t) is linearly changed as time goes on and then the time elapses by 'α' (t=α), θ(t) may be 0 degree, and $h_{crt}(\alpha)$ may be the head related transfer function corresponding to the front orientation. When the user's head rotates additionally before the time elapses by 'α' after the user's head rotates, $\theta_{rot}$ may be changed depending on Equation 2 below.

$$\theta_{rot} = \theta(t') + \theta_{rot}'$$ [Equation 2]

θ(t') may be the orientation (or angle) of the sound image corresponding to time t' at which the user additionally rotates his/her head; $\theta_{rot}'$ may be the additional rotation angle of the user's head. When the user's head rotates additionally, 't' may be initialized.

According to the above-described embodiment, when the user rotates his/her head, the location of the sound image may move gradually in the orientation, in which the user's head rotates, during a specific time; as such, compared with a method in which the sound image is always placed in front, it is possible to provide the user with stereoscopic and dynamic sound.

Figure 8:
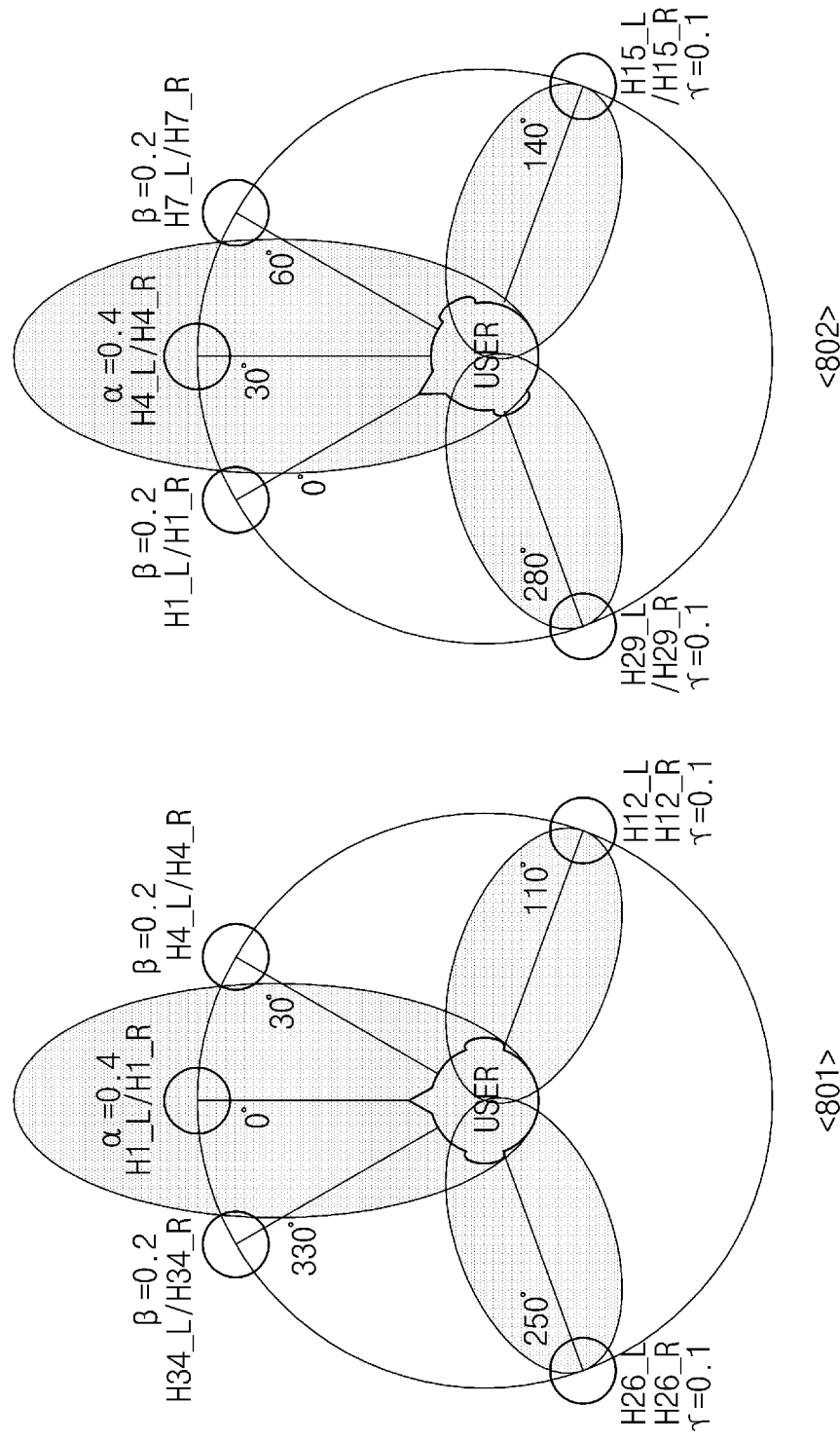
FIG. 8 is a view illustrating a method of selecting a head related transfer function, according to various embodiments of the present disclosure.

FIG. 8 is a view illustrating a method of selecting a head related transfer function, according to various embodiments of the present disclosure.

The embodiment described with reference to FIG. 8 is exemplified as a head related transfer function is stored in the memory 630 after being measured at intervals of 10 degrees, as illustrated in Table 1.

According to an embodiment, the HRTF selection module 651 may select a plurality of head related transfer functions among a plurality of head related transfer functions stored in the memory 630. The HRTF selection module 651 may synthesize the selected plurality of head related transfer functions to generate the head related transfer function to be applied to an audio signal. Image 801 of FIG. 8 illustrates an example of the synthesis of the head related transfer function corresponding to a first orientation (e.g., a user's front orientation); image 802 of FIG. 8 illustrates an example of the synthesis of the head related transfer function corresponding to a third orientation symmetrical to a second orientation with respect to the first orientation, when the user's head rotates from the first direction to the second direction.

Referring to image 801 of FIG. 8, the HRTF selection module 651 may select a plurality of head related transfer functions corresponding to a plurality of sound images placed in a plurality of orientations including the first orientation (e.g., front orientation). For example, the HRTF selection module 651 may select a first head related transfer function H1_L and H1_R corresponding to a sound image placed in the orientation of 0 degree (the first orientation), a fourth head related transfer function H4_L and H4_R corresponding to the sound image placed in the orientation of 30 degrees, a twelfth head related transfer function H12_L and H12_R corresponding to the sound image placed in the orientation of 110 degrees, a 26th head related transfer function H26_L and H26_R corresponding to the sound image placed in the orientation of 250 degrees, and a 34th head related transfer function H34_L and H34_R corresponding to the sound image placed in the orientation of 330 degrees.

The HRTF selection module 651 may set at least partly different weights α, β, and γ to the selected plurality of head related transfer functions. Each of the sum of weights set to the plurality of left head related transfer function and the sum of weights set to the plurality of right head related transfer function may be '1'. For example, the HRTF selection module 651 may set the weight of 0.4 to the first head related transfer function H1_L and H1_R, may set the weight of 0.2 to each of the fourth head related transfer function H4_L and H4_R and the 34th head related transfer function H34_L and H34_R, and may set the weight of 0.1 to each of the twelfth head related transfer function H12_L and H12_R and the 26th head related transfer function H26_L and H26_R.

The HRTF selection module 651 may synthesize a plurality of head related transfer functions depending on the set weights to generate the head related transfer function corresponding to the first orientation. For example, the HRTF selection module 651 may synthesize the first left head related transfer function H1_L, the fourth left head related transfer function H4_L, the 34th left head related transfer function H34_L, the twelfth left head related transfer function H12_L, and the 26th left head related transfer function H26_L depending on the set weights to generate the left head related transfer function corresponding to the first orientation; the HRTF selection module 651 may synthesize the first right head related transfer function H1_R, the fourth right head related transfer function H4_R, the 34th right head related transfer function H34_R, the twelfth right head related transfer function H12_R, and the 26th right head related transfer function H26_R depending on the set weights to generate the right head related transfer function corresponding to the first orientation.

According to an embodiment, the number, the orientations, and the weights of head related transfer functions selected by the HRTF selection module 651 may be changed depending on the user's preference.

Referring to image 802 of FIG. 8, when the user's head rotates to the left side by 30 degrees, the HRTF selection module 651 may select a plurality of head related transfer functions corresponding to a plurality of sound images placed in a plurality of orientations including an orientation (e.g., the third orientation) in which the user's head rotates to the right side by 30 degrees. For example, the HRTF selection module 651 may select the fourth head related transfer function H4_L and H4_R corresponding to the sound image placed in the orientation of 30 degree (the third orientation), the seventh head related transfer function H7_L and H7_R corresponding to the sound image placed in the orientation of 60 degrees, a fifteenth head related transfer function H15_L and H15_R corresponding to the sound image placed in the orientation of 140 degrees, the 29th head related transfer function H29_L and H29_R corresponding to the sound image placed in the orientation of 280 degrees, and the first head related transfer function H1_L and H1_R corresponding to the sound image placed in the orientation of 0 degree.

The HRTF selection module 651 may set at least partly different weights $\alpha$, $\beta$, and $\gamma$ to the selected plurality of head related transfer functions. Each of the sum of weights set to the plurality of left head related transfer function and the sum of weights set to the plurality of right head related transfer function may be '1'. For example, the HRTF selection module 651 may set the weight of 0.4 to the fourth head related transfer function H4_L and H4_R, may set the weight of 0.2 to each of the seventh head related transfer function H7_L and H7_R and the first head related transfer function H1_L and H1_R, and may set the weight of 0.1 to each of the fifteenth head related transfer function H15_L and H15_R and the 29th head related transfer function H29_L and H29_R.

The HRTF selection module 651 may synthesize a plurality of head related transfer functions depending on the set weight to generate the head related transfer function corresponding to the third orientation. For example, the HRTF selection module 651 may synthesize the fourth left head related transfer function H4_L, the seventh left head related transfer function H7_L, the first left head related transfer function H1_L, the fifteenth left head related transfer function H15_L, and the 29th left head related transfer function H29_L depending on the set weight to generate the left head related transfer function corresponding to the third orientation; the HRTF selection module 651 may synthesize the fourth right head related transfer function H4_R, the seventh right head related transfer function H7_R, the first right head related transfer function H1_R, the fifteen right head related transfer function H15_R, and the 29th right head related transfer function H29_R depending on the set weight to generate the right head related transfer function corresponding to the third orientation.

In the case of synthesizing head related transfer functions corresponding to a plurality of orientations and utilizing the generated head related transfer function, it is possible to provide the user with a more stereoscopic and rich sound.

According to an embodiment, the HRTF filter 653 illustrated in FIG. 6 may apply the head related transfer function, which is selected (or generated) by the HRTF selection module 651, to an audio signal received through the communication module 610 or an audio signal stored in the memory 630 to generate a stereo signal. For example, the HRTF filter 653 may apply a left head related transfer function to the audio signal to generate a first channel signal; and the HRTF filter 653 may apply a right head related transfer function to the audio signal to generate a second channel signal. According to an embodiment, the HRTF filter 653 may perform convolution on the audio signal and the head related transfer function to generate the stereo signal.

According to an embodiment, when the head related transfer function selected (or generated) by the HRTF selection module 651 is changed depending on the movement of user's head, the HRTF filter 653 may apply the changed head related transfer function to generate the stereo signal. According to an embodiment, the HRTF filter 653 may transmit the generated stereo signal to the speaker 640. For example, the HRTF filter 653 may transmit the first channel stereo signal to a first speaker 641 and may transmit the second channel stereo signal to a second speaker 642. According to an embodiment, the first speaker 641 may output the first channel stereo signal and the second speaker 642 may output the second channel stereo signal.

Figure 9:
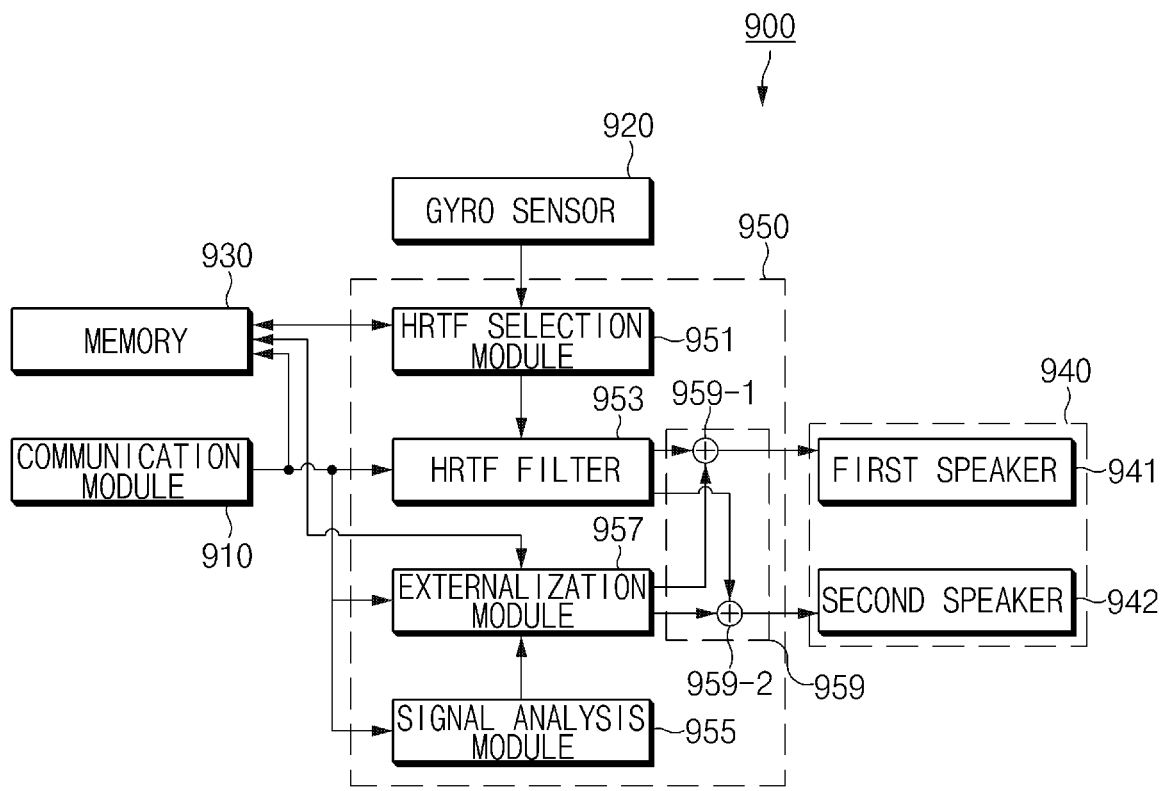
FIG. 9 is a block diagram illustrating a configuration of an electronic device, according to various embodiments of the present disclosure.

FIG. 9 is a block diagram illustrating a configuration of an electronic device, according to various embodiments of the present disclosure.

Referring to FIG. 9, an electronic device 900 (e.g., the electronic device 400) may include a communication module 910, a gyro sensor 920, a memory 930, a speaker 940, and a processor 950.

Since the communication module 910, the gyro sensor 920, the memory 930, and the speaker 940 of a configuration of the electronic device 900 illustrated in FIG. 9 may perform the same or similar function as or to the communication module 410, the gyro sensor 420, the memory 430, and the speaker 440 illustrated in FIG. 4, the detailed descriptions thereof may be omitted, and the operation of the processor 950 will be mainly described.

According to an embodiment, the processor 950 may include a HRTF selection module 951, a HRTF filter 953, a signal analysis module 955, an externalization module 957, and a synthesis module 959. Since the HRTF selection module 951 and the HRTF filter 953 of a configuration of the processor 950 may perform the same or similar function as or to the HRTF selection module 651 and the HRTF filter 653 illustrated in FIG. 6, the detailed descriptions thereof may be omitted, and the remaining components will be mainly described.

According to an embodiment, the signal analysis module 955 may determine whether an audio signal received through the communication module 910 or an audio signal stored in the memory 930 is a voice signal or another type of signal (e.g., a music signal, a background signal, or the like). For example, the signal analysis module 955 may analyze the signal characteristic (e.g., frequency, waveform, amplitude, or the like) of the audio signal to determine whether the audio signal is a voice signal. For another example, a transmitter device for transmitting the audio signal may include information about the type of audio signal in a packet for transmitting the audio signal. For example, when transmitting a voice signal such as call data, the transmitter device may insert information indicating a voice signal in the packet. The signal analysis module 955 may determine whether the audio signal is the voice signal, using information included in the packet.

According to an embodiment, the externalization module 957 may apply a room impulse response function stored in the memory 930 to the audio signal through the communication module 910 to generate an externalization signal. For example, the externalization module 957 may apply a left room impulse response function to the audio signal to generate a first externalization signal and may apply a right room impulse response function to the audio signal to generate a second externalization signal. According to an embodiment, the externalization module 957 may perform convolution on the audio signal and the room impulse response function to generate the externalization signal.

Figure 10:
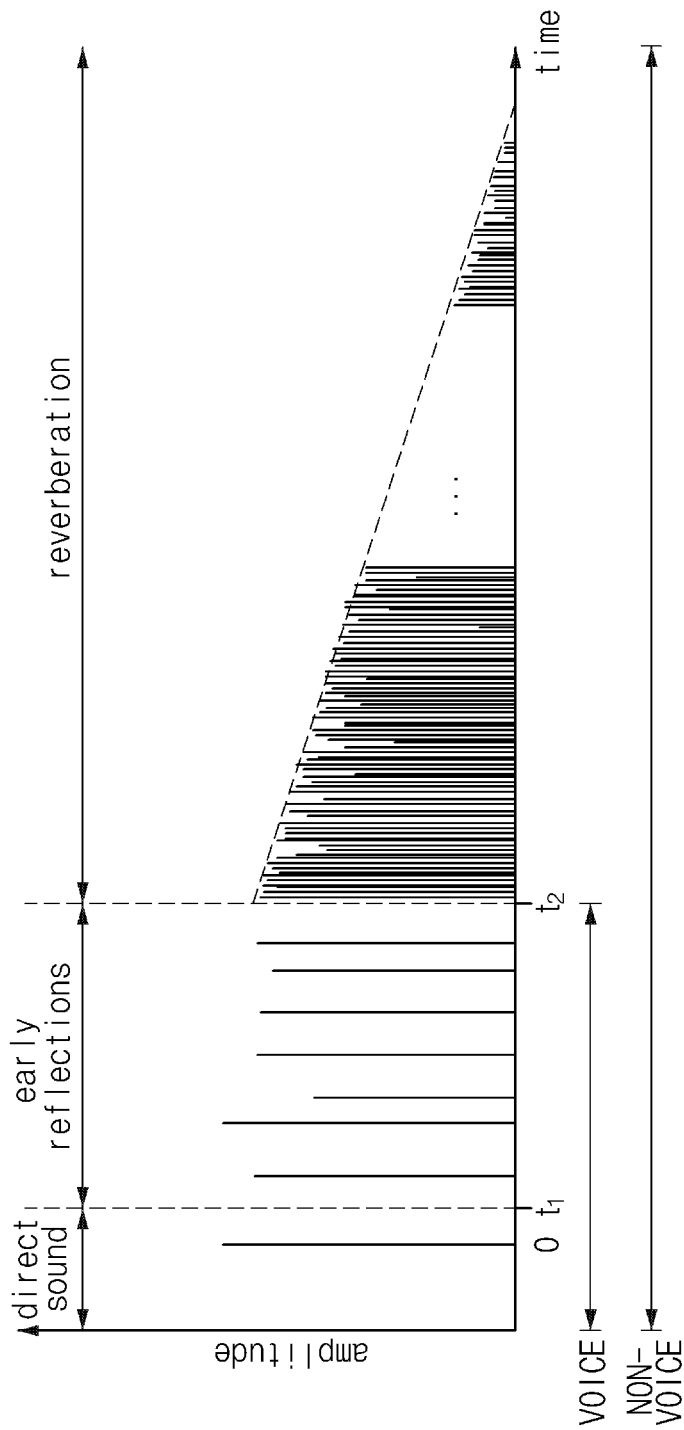
FIG. 10 illustrates an example of a room impulse response function, according to various embodiments of the present disclosure.

FIG. 10 illustrates an example of a room impulse response function, according to various embodiments of the present disclosure.

Referring to FIG. 10, a room impulse response function may include direct sound, which is directly transmitted from a sound source to an ear within a first time t1 after sound occurs from the sound source, early reflection, which is transmitted to the ear after reflected within a second time t2 (e.g., 50 ms to 100 ms), and a reverberation component that is transmitted to the ear after the second time t2.

According to an embodiment, the externalization module 957 may change a sampling time of the room impulse response function to the audio signal depending on whether an audio signal is a voice signal. For example, when the audio signal is the voice signal, the externalization module 957 may apply the room impulse response function included within the second time to generate an externalization signal not including the reverberation component. For another example, when the audio signal is not the voice signal, the externalization module 957 may apply the room impulse response function including the component after the second time to generate the externalization signal including the reverberation component.

Since a finite impulse response (FIR) type of room impulse response function measured in an indoor environment has a very long length, a lot of memory space may be required; since data throughput is high, the FIR type of room impulse response function may not be suitable for a real-time calculation. As such, an infinite impulse response (IIR) type room impulse response function may be generated through a virtual modeling method in consideration of the effect due to a reverberation component in the indoor environment.

Equation 3 below illustrates an example of an all-pass function (or all-pass filter) being the IIR type of room impulse response function.

$$H(Z) = \frac{Z^{-N} - a}{1 - aZ^{-N}}, 0.5 < a < 0.8, 1 < N < 64 \quad \text{[Equation 3]}$$

'Z' is Z-transformed frequency function; 'a' is a coefficient for adjusting the locations of the maximum value and the minimum value of all-pass function H(t); 'N' corresponds to a sample delay time. The higher order of the all-pass function may be applied as 'N' increases.

According to an embodiment, the externalization module 957 may change the value of 'a' and the value of 'N' depending on whether the audio signal is the voice signal. For example, when the audio signal is the voice signal, the externalization module 957 may set 'a' and 'N' to the relatively low values; when the audio signal is not the voice signal, the externalization module 957 may set 'a' and 'N' to the relatively high values.

Figure 11:
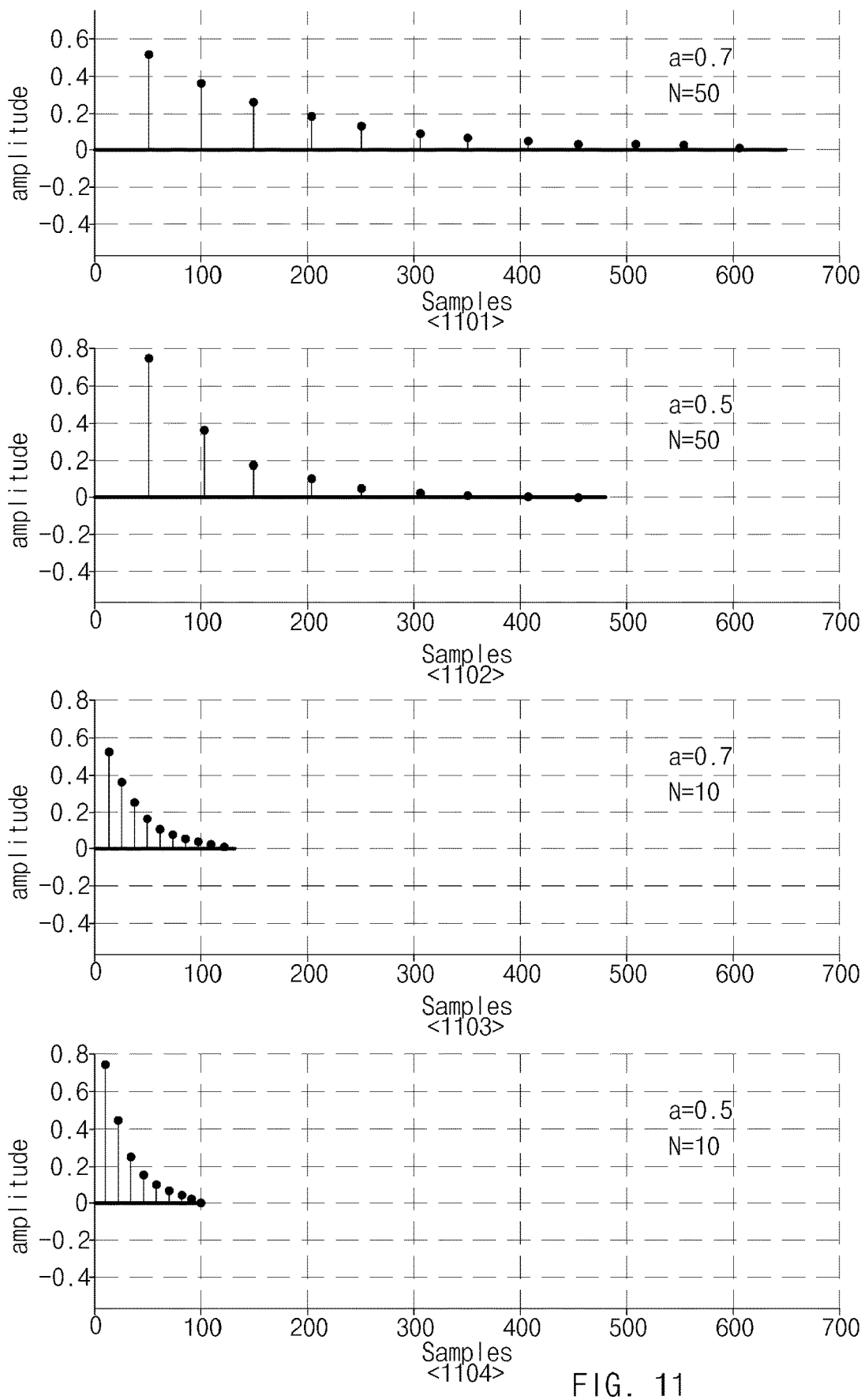
FIG. 11 is a view illustrating an example of an all-pass function, according to various embodiments of the present disclosure.

FIG. 11 is a view illustrating an example of an all-pass function, according to various embodiments of the present disclosure.

Image 1101 of FIG. 11 may denote an all-pass function in the case where 'a' is set to 0.7 and 'N' is set to '50'; image 1102 may denote an all-pass function in the case where 'a' is set to 0.5 and 'N' is set to '50'; image 1103 may denote an all-pass function in the case where 'a' is set to 0.7 and 'N' is set to '10'; and image 1104 may denote an all-pass function in the case where 'a' is set to 0.5 and 'N' is set to '10'.

According to an embodiment, when an audio signal is not a voice signal, the externalization module 957 may apply the all-pass function illustrated in image 1101 of FIG. 11 to the audio signal. According to an embodiment, when the audio signal is the voice signal, the externalization module 957 may apply the all-pass function illustrated in image 1104 of FIG. 11 to the audio signal.

According to an embodiment, for the purpose of increasing the decorrelation effect between a first channel signal and a second channel signal, the externalization module 957 may set the coefficient 'a' of the all-pass function so as to be changed as time goes on as illustrated in Equation 4 below.

$$\alpha(t) = \alpha_0 + \text{random}(t) \quad \text{[Equation 4]}$$

Since the voice signal are mainly used for information transmission unlike music, the stereoscopic and realistic sound of which is important, it is important to enhance the clarity of the voice. The clarity of the voice may be reduced when a reverberation component is included in the voice signal. According to the above-described embodiment, it is possible to differently apply a room impulse response function depending on a type of audio signal, thereby maintaining the clarity of the voice in the case of outputting the voice signal and providing stereoscopic and rich sound in the case of outputting the non-voice signal.

According to an embodiment, the synthesis module 959 may synthesize the stereo signal generated by the HRTF filter 953 and an externalization signal generated by the externalization module 957. According to an embodiment, the synthesis module 959 may include a plurality of signal synthesizers (e.g., a first synthesizer 959-1 and a second synthesizer 959-2). According to an embodiment, the first synthesizer 959-1 may synthesize a stereo signal of a first channel and an externalization signal of the first channel to generate a first channel synthesis signal; and the second synthesizer 959-2 may synthesize a stereo signal of a second channel and an externalization signal of the second channel to generate a second channel synthesis signal.

According to an embodiment, the synthesis module 959 may transmit the generated synthesis signal to the speaker 940. For example, the first synthesizer 959-1 may transmit a first channel synthesis signal to the first speaker 941, and the second synthesizer 959-2 may transmit a second channel synthesis signal to the second speaker 942. According to an embodiment, the first speaker 941 may output the first channel synthesis signal and the second speaker 942 may output the second channel synthesis signal.

Figure 12:
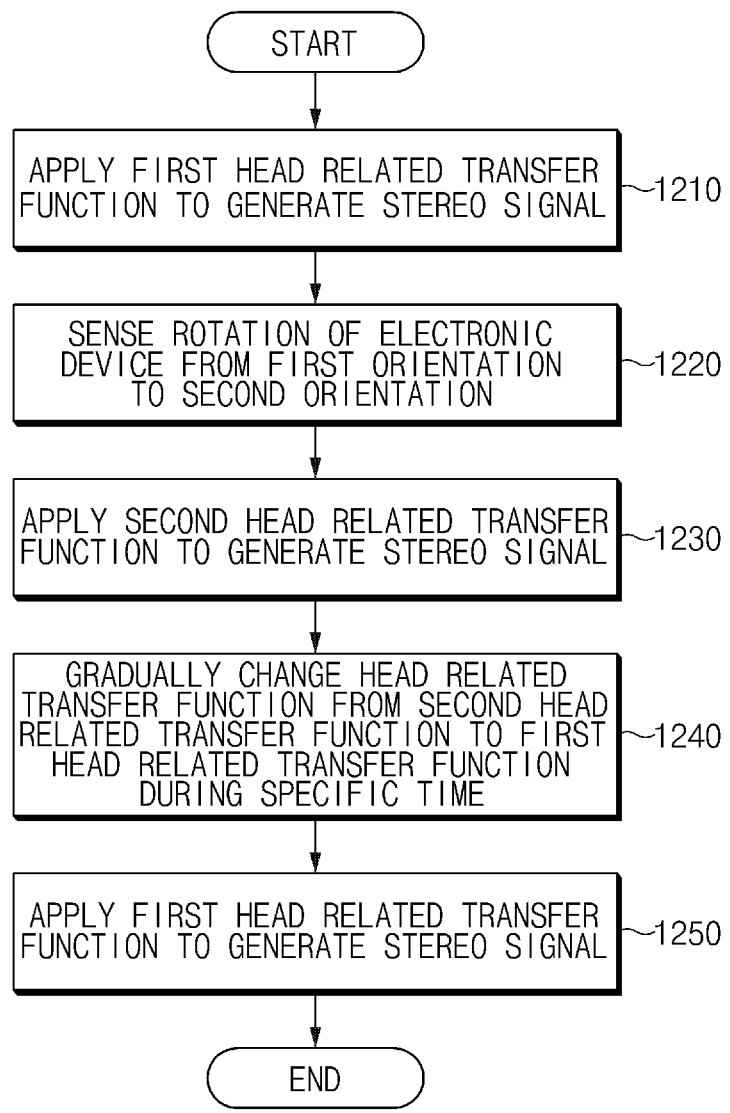
FIG. 12 is a flowchart illustrating an audio outputting method of an electronic device, according to various embodiments of the present disclosure.

FIG. 12 is a flowchart illustrating an audio outputting method of an electronic device, according to various embodiments of the present disclosure.

The flowchart illustrated in FIG. 12 may include operations that the above-described electronic device (e.g., the electronic device 400) processes. Even though omitted below, detailed descriptions about the electronic device described with reference to FIGS. 1 to 11 may be applied to the flowchart shown in FIG. 12.

According to an embodiment, in operation 1210, an electronic device may apply a first head related transfer function to an audio signal to generate a stereo signal. For example, the audio signal may be received from an external electronic device through a communication module or may be stored in a memory. According to an embodiment, in a state where a user's head does not rotate, the electronic device may apply the first head related transfer function corresponding to a first orientation relative to the electronic device to the audio signal to generate the stereo signal.

According to an embodiment, the electronic device may select a head related transfer function corresponding to a sound image placed in the first orientation, as the first head related transfer function and may generate the stereo signal, using the selected first head related transfer function.

According to an embodiment, the electronic device may synthesize a plurality of head related transfer functions corresponding to a plurality of sound images placed in a plurality of orientations including the first orientation, to generate the first head related transfer function and then may generate the stereo signal, using the generated first head related transfer function. For example, the electronic device may set at least partly different weights to a plurality of head related transfer functions and may synthesize a plurality of head related transfer functions depending on the set weight to generate the first head related transfer function.

According to an embodiment, in operation 1220, the electronic device may sense that the electronic device rotates from the first direction to a second direction. According to an embodiment, the electronic device may sense the rotation (or the rotation of the user's head) of the electronic device, using a gyro sensor.

According to an embodiment, when the electronic device rotates from the first direction to the second direction, in operation 1230, the electronic device may apply a second head related transfer function to the audio signal to generate the stereo signal. According to an embodiment, when the user's head rotates from the first direction to the second direction, the electronic device may apply the second head related transfer function corresponding to a second orientation relative to the electronic device, which is corresponding to the first direction, to the audio signal.

According to an embodiment, the electronic device may select a head related transfer function corresponding to a sound image placed in the second orientation, as the second head related transfer function and may generate the stereo signal, using the selected second head related transfer function.

According to an embodiment, the electronic device may synthesize a plurality of head related transfer functions corresponding to a plurality of sound images placed in a plurality of orientations including the second orientation, to generate the second head related transfer function and then may generate the stereo signal, using the generated second head related transfer function. For example, the electronic device may set at least partly different weights to a plurality of head related transfer functions and may synthesize a plurality of head related transfer functions depending on the set weight to generate the second head related transfer function.

According to an embodiment, in operation 1240, the electronic device may gradually change the head related transfer function to be applied to the audio signal, from the second head related transfer function to the first head related transfer function during a specific time. According to an embodiment, the electronic device may respectively set weights to the first head related transfer function and the second head related transfer function and may synthesize the first head related transfer function and the second head related transfer function depending on the set weights. The electronic device may change the weight set to each of the first head related transfer function and the second head related transfer function, as time goes on and then may allow the head related transfer function to be gradually changed during the specific time. For example, the electronic device may increase the weight set to the first head related transfer function during the specific time and may decrease the weight set to the second head related transfer function during the specific time.

According to an embodiment, in operation 1250, when a specified time elapses, an electronic device may apply the first head related transfer function to the audio signal to generate the stereo signal.

According to an embodiment, the electronic device may output the generated stereo signal through a plurality of speakers. For example, the electronic device may output a first channel signal of the stereo signal through a first speaker and may output a second channel signal of the stereo signal through a second speaker.

Figure 13:
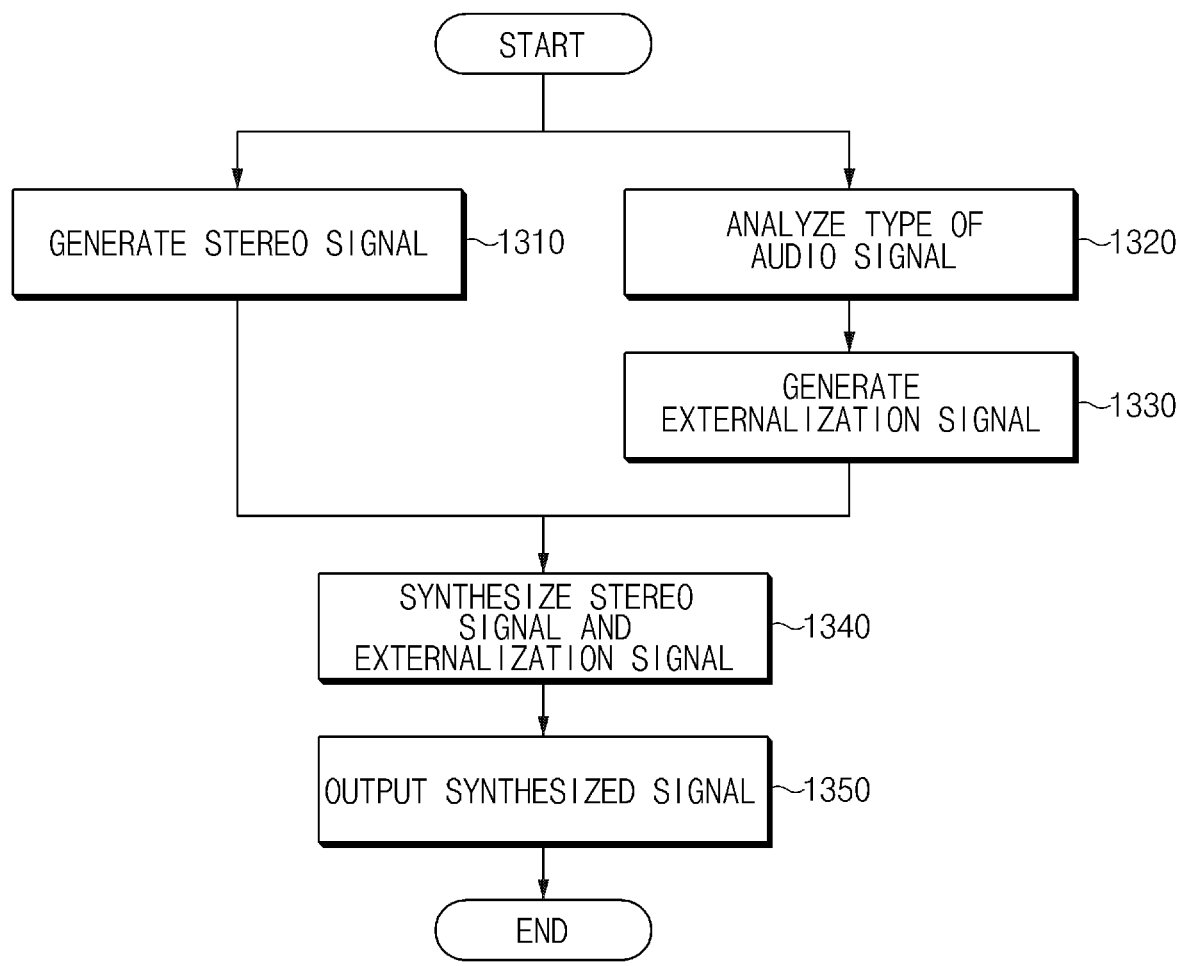
FIG. 13 is a flowchart illustrating an audio outputting method of an electronic device, according to various embodiments of the present disclosure.

FIG. 13 is a flowchart illustrating an audio outputting method of an electronic device, according to various embodiments of the present disclosure.

The flowchart illustrated in FIG. 13 may include operations that the above-described electronic device (e.g., the electronic device 400) processes. Even though omitted below, detailed descriptions about the electronic device described with reference to FIGS. 1 to 11 may be applied to the flowchart shown in FIG. 13.

According to an embodiment, in operation 1310, an electronic device may apply a head related transfer function to an audio signal to generate a stereo signal. For example, the audio signal may be received from an external electronic device through a communication module or may be stored in a memory. For example, the electronic device may apply a left head related transfer function to the audio signal to generate a first channel stereo signal; and the electronic device may apply a right head related transfer function to the audio signal to generate a second channel stereo signal.

According to an embodiment, in operation 1320, the electronic device may analyze a type of audio signal. According to an embodiment, the electronic device may determine whether the audio signal received through a communication module is a voice signal or another type of signal (e.g., a music signal, a background signal, or the like). For example, the electronic device may analyze the signal characteristic (e.g., frequency, waveform, amplitude, or the like) of the received audio signal to determine whether the audio signal is a voice signal. For another example, the electronic device may determine whether the audio signal is a voice signal, using information included in the packet including the audio signal.

According to an embodiment, in operation 1330, the electronic device may generate an externalization signal. According to an embodiment, the electronic device may apply the room impulse response function to the received audio signal to generate the externalization signal. For example, the electronic device may apply a left room impulse response function to the audio signal to generate a first channel externalization signal and may apply a right room impulse response function to the audio signal to generate a second channel externalization signal.

According to an embodiment, the electronic device may generate the externalization signal based on a type of audio signal. For example, when the audio signal is a voice signal, the electronic device may apply a room impulse response function corresponding to the first time to the audio signal to generate the externalization signal not including a reverberation component. For another example, when the audio signal is not a voice signal, the electronic device may apply a room impulse response function corresponding to a second time longer than the first time, to the audio signal to generate the externalization signal including the reverberation component.

According to an embodiment, in operation 1340, the electronic device may synthesize the stereo signal and the externalization signal to generate a synthesis signal. According to an embodiment, the electronic device may include a plurality of signal synthesizers (e.g., the first synthesizer 959-1 and the second synthesizer 959-2 of FIG. 9). According to an embodiment, the electronic device may synthesize a first channel stereo signal and a first channel externalization signal, using a first synthesizer; and the electronic device may synthesize a second channel stereo signal and a second channel externalization signal, using a second synthesizer.

According to an embodiment, in operation 1350, the electronic device may output the synthesized signal. According to an embodiment, the electronic device may output the synthesized signal through a plurality of speakers. For example, the electronic device may output a first channel signal of the synthesized signal through a first speaker and may output a second channel signal of the synthesized signal through a second speaker.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
 a plurality of speakers wearable on a user's head;
 a gyro sensor configured to sense a rotation of the electronic device;
 a memory configured to store a plurality of head related transfer functions corresponding to a plurality of orientations relative to the plurality of speakers; and
 a processor, wherein the processor is configured to provide a stereo signal to the plurality of speakers from an audio signal by:
  applying a first head related transfer function corresponding to a first orientation relative to the plurality of speakers to the audio signal to form a sound image in the first orientation relative to the plurality of speakers before sensing the rotation of the electronic device;
  in response to sensing the rotation of the electronic device from a first direction to a second direction, applying a second head related transfer function corresponding to a second orientation relative to the plurality of speakers to form the sound image in the second orientation relative to the plurality of speakers, the second orientation relative to the plurality of speakers corresponding to the first direction; and
  when a specific time elapses after sensing the rotation of the electronic device, applying the first head related transfer function to the audio signal to form the sound image in the first orientation relative to the plurality of speakers.

2. The electronic device of claim 1, wherein the processor is configured to apply the second head related transfer function by:
 gradually changing a head related transfer function to be applied to the audio signal from the second head related transfer function to the first head related transfer function during the specific time.

3. The electronic device of claim 2, wherein the processor is configured to:
 set a first weight to the first head related transfer function;
 set a second weight to the second head related transfer function;
 during the specific time, increase the first weight set to the first head related transfer function and decrease the second weight set to the second head related transfer function; and
 synthesize the head related transfer function to be applied to the audio signal depending on the first weight and the second weight.

4. The electronic device of claim 1, wherein the processor is configured to:
 synthesize the plurality of head related transfer functions configured to form a plurality of sound images placed in a plurality of orientations including the first orientation to generate the first head related transfer function; and
 synthesize the plurality of head related transfer functions configured to form the plurality of sound images placed in the plurality of orientations including the second orientation to generate the second head related transfer function.

5. The electronic device of claim 4, wherein the processor is configured to:
set a different weight to at least part of the plurality of head related transfer functions; and
synthesize the plurality of head related transfer functions depending on the weight to generate the first head related transfer function or the second head related transfer function.

6. The electronic device of claim 1, wherein the processor is configured to:
apply a room impulse response function to the audio signal to generate an externalization signal; and
synthesize the stereo signal and the externalization signal.

7. The electronic device of claim 6, wherein the processor is configured to:
determine whether the audio signal is a voice signal;
when the audio signal is the voice signal, apply the room impulse response function corresponding to a first time, to the audio signal; and
when the audio signal is not the voice signal, apply the room impulse response function corresponding to a second time longer than the first time, to the audio signal.

8. The electronic device of claim 7, wherein the processor is configured to:
analyze a signal characteristic of the audio signal; and
determine whether the audio signal is the voice signal, based on the signal characteristic.

9. The electronic device of claim 1, wherein the plurality of speakers further comprises:
a first speaker; and
a second speaker, and
wherein the processor is configured to:
output a first channel signal of the stereo signal through the first speaker; and
output a second channel signal of the stereo signal through the second speaker.

10. A method for outputting a stereo signal from an audio signal by an electronic device, the method comprising;
applying a first head related transfer function corresponding to a first orientation relative to a plurality of speakers of the electronic device to an audio signal to form a sound image in the first orientation relative to the plurality of speakers before sensing a rotation of the electronic device;
sensing the rotation of the electronic device by using a gyro sensor of the electronic device;
in response to sensing the rotation of the electronic device from a first direction to a second direction, applying a second head related transfer function corresponding to a second orientation relative to the plurality of speakers to form the sound image in the second orientation relative to the plurality of speakers, the second orientation relative to the plurality of speakers corresponding to the first direction; and
when a specific time elapses after sensing the rotation of the electronic device, applying the first head related transfer function to the audio signal to form the sound image in the first orientation relative to the plurality of speakers.

11. The method of claim 10, further comprising:
gradually changing a head related transfer function to be applied to the audio signal from the second head related transfer function to the first head related transfer function during the specific time.

12. The method of claim 11, wherein the gradually changing of the head related transfer function to be applied to the audio signal from the second head related transfer function to the first head related transfer function includes:
setting a first weight to the first head related transfer function;
setting a second weight to the second head related transfer function;
during the specific time, increasing the first weight set to the first head related transfer function and decreasing the second weight set to the second head related transfer function; and
synthesizing the head related transfer function to be applied to the audio signal depending on the first weight and the second weight.

13. The method of claim 10, further comprising:
synthesizing a plurality of head related transfer functions configured to form a plurality of sound images placed in a plurality of orientations including the first orientation to generate the first head related transfer function; and
synthesizing the plurality of head related transfer functions configured to form the plurality of sound images placed in the plurality of orientations including the second orientation to generate the second head related transfer function.

* * * * *